United States Patent
Byon et al.

(10) Patent No.: US 11,312,106 B2
(45) Date of Patent: Apr. 26, 2022

(54) CFRP SURFACE COATING METHOD AND HYDRAULIC CYLINDER INCLUDING COMPONENT COATED THEREBY

(71) Applicants: SHPAC CO., LTD, Busan (KR); KOREA INSTITUTE OF MACHINERY & MATERIALS, Daejeon (KR)

(72) Inventors: Eung Sun Byon, Changwon-Si (KR); Sung Hun Lee, Changwon-Si (KR); Uk Hee Nam, Changwon-Si (KR); Hun Kwan Park, Changwon-Si (KR); Yeon Woo Yoo, Anyang-Si (KR); Yun Ju Lee, Yongin-Si (KR); Hye Kyeong Lee, Changwon-Si (KR)

(73) Assignees: SHPAC CO., LTD.; KOREA INSTITUTE OF MACHINERY & MATERIALS

( * ) Notice: Subject to any disclaimer, the term of this patent is extended or adjusted under 35 U.S.C. 154(b) by 0 days.

(21) Appl. No.: 17/091,283

(22) Filed: Nov. 6, 2020

(65) Prior Publication Data

US 2021/0053318 A1    Feb. 25, 2021

Related U.S. Application Data

(63) Continuation of application No. PCT/KR2018/009560, filed on Aug. 21, 2018.

(30) Foreign Application Priority Data

May 31, 2018    (KR) .................. 10-2018-0062329

(51) Int. Cl.
  *B32B 15/02*   (2006.01)
  *B32B 1/08*   (2006.01)
  (Continued)

(52) U.S. Cl.
  CPC ............ *B32B 15/02* (2013.01); *B32B 1/08* (2013.01); *B32B 5/028* (2013.01); *B32B 5/26* (2013.01);
  (Continued)

(58) Field of Classification Search
  CPC .. C23C 4/02; C23C 4/10; C23C 4/134; C23C 4/129; C23C 4/131; C23C 4/08;
  (Continued)

(56) References Cited

U.S. PATENT DOCUMENTS

| | | | | |
|---|---|---|---|---|
| 5,104,726 A * | 4/1992 | Ross | ................. | D03D 11/00 442/207 |
| 5,629,062 A * | 5/1997 | Ejiri | ................. | B32B 1/08 428/36.9 |
| 2015/0044925 A1* | 2/2015 | Kamihara | ........... | B32B 15/02 442/1 |

FOREIGN PATENT DOCUMENTS

| | | |
|---|---|---|
| JP | 2006029452 A | 2/2006 |
| JP | 2015085564 A | 5/2015 |

(Continued)

OTHER PUBLICATIONS

Korean Notice of Allowance (KR 10-2018-0062329), KIPO, dated Sep. 30, 2019.

(Continued)

*Primary Examiner* — Vishal I Patel
(74) *Attorney, Agent, or Firm* — Park & Associates IP Law, P.C.

(57) ABSTRACT

Proposed is a CFRP surface coating method and a hydraulic cylinder including a component coated by the method. The CFRP surface coating method can prevent damage to a CFRP surface due to thermal spray coating and increase the bonding strength between a CFRP surface and a metal coating layer formed by the thermal spray coating. To this end, the method includes: forming a mesh layer on a CFRP (Continued)

surface; fixing the mesh layer on the CFRP surface by impregnating a heat-resistant resin therein; and forming a metal coating layer by thermal spray coating on the fixed mesh layer in which the heat-resistant resin is impregnated.

6 Claims, 3 Drawing Sheets

(51) Int. Cl.
    *B32B 5/02*     (2006.01)
    *B32B 5/26*     (2006.01)
    *B32B 15/14*     (2006.01)
    *B32B 38/08*     (2006.01)
    *C23C 4/08*     (2016.01)
    *F15B 15/20*     (2006.01)

(52) U.S. Cl.
    CPC .............. *B32B 15/14* (2013.01); *B32B 38/08* (2013.01); *C23C 4/08* (2013.01); *F15B 15/20* (2013.01); *B32B 2255/06* (2013.01); *B32B 2255/205* (2013.01); *B32B 2260/046* (2013.01)

(58) Field of Classification Search
    CPC . C23C 4/06; B32B 2260/046; B32B 2255/06; B32B 2307/302; B32B 1/08; B32B 38/08; B32B 5/12; B32B 15/14; B32B 5/26; B32B 2262/106; B32B 27/12; B32B 2260/021; B32B 7/12; B32B 15/02; B32B 2255/02; B32B 2255/205; B32B 5/028; B32B 2597/00; B32B 2262/103; F15B 15/1457; F15B 15/20; F15B 2215/305; F15B 15/1428; B29C 53/58
See application file for complete search history.

(56) References Cited

FOREIGN PATENT DOCUMENTS

| | | |
|---|---|---|
| JP | 2016531205 A | 10/2016 |
| KR | 101126109 B1 | 3/2012 |
| KR | 1020150117441 A | 10/2015 |
| WO | 2013146229 A1 | 10/2013 |

OTHER PUBLICATIONS

International Search Report (PCT/KR2018/009560), WIPO, dated Apr. 12, 2019.

\* cited by examiner

CFRP SURFACE COATING METHOD AND HYDRAULIC CYLINDER INCLUDING COMPONENT COATED THEREBY

REFERENCE TO RELATED APPLICATIONS

This is a continuation of International Patent Application PCT/KR2018/009560 filed on Aug. 21, 2018, which designates the United States and claims priority of Korean Patent Application No. 10-2018-0062329 filed on May 31, 2018, the entire contents of which are incorporated herein by reference.

FIELD OF THE INVENTION

The present disclosure relates to a carbon fiber reinforced plastic (CFRP) surface coating method and a hydraulic cylinder including a component coated by the method. More particularly, for implementing a lightweight hydraulic cylinder, the present disclosure provides a hydraulic cylinder in which all or a part of components such as a rod or tube of a hydraulic cylinder are formed of CFRP so that the surface thereof is formed of a coating layer that is coated by the method of the present disclosure.

BACKGROUND OF THE INVENTION

Hydraulic cylinders are core components for construction machinery and high-lift vehicles, and there is a need for developing lightweight hydraulic cylinders recently.

In other words, by reducing the weight of the hydraulic cylinders by 30 percent, the total weight of such construction machinery and high-lift vehicles may be reduced by 6 to 15 percent. Since this makes it possible to realize improvements in energy efficiency in equipment operation, development of the lightweight hydraulic cylinder has been gaining attention.

For the purpose of the lightweight these hydraulic cylinders, all or part of cylinder tubes and rods are formed of carbon fiber reinforced plastic (CFRP) which is a high-tech complex material that is attracting attention as a lightweight structural material with high-strength and high-elasticity. In addition, a thermal spray has been adopted for forming a coating layer consisting of metal, ceramic, or a mixture thereof on a surface of the cylinder tube or rod formed of the CFRP.

In general, thermal spray coating is a technology that introduces powders or linear materials to a high-temperature heat source whereby the powders or the linear materials are transformed into molten droplets by heating. The molten droplets are then collided with a substrate at high-speed and are rapidly solidified, thus forming a laminated film.

Due to these characteristics of thermal spray coating, it is not possible to directly form a thermal spray coating on a CFRP surface. Therefore, traditionally, an interlayer using a heat-resistant resin, metal powder-mixed resin, or graphite has been formed before performing the thermal spray coating. However, there is a problem of causing damage to the CFRP surface while the high-temperature and high-speed metal particles collide with the interlayer during the thermal spray coating.

To overcome this problem, thermal spray coating has been performed by forming an interlayer by winding a metal wire after applying a primer to the CFRP surface. However, this method also allows a collision of the high-temperature and high-speed metal particles with the interlayer, which causes a debonding of the wound wire so that a bonding strength of the wire is lowered. Thus, the degree of completion of the metal coating layer by thermal spray coating is lowered.

Therefore, research of a CFRP surface coating technology that may contribute to the development of a lightweight hydraulic cylinder by solving the above-described problems is required.

(Patent Document 1) Korean Patent No. 10-1126109 "Thermal spray roller and producing method thereof" (Published on Mar. 20, 2012)

SUMMARY OF THE INVENTION

The present disclosure has been made in view of the problems occurring in the related art, and an objective of the present disclosure is to provide a carbon fiber reinforced plastic (CFRP) surface coating method that may prevent damage to the CFRP surface caused by thermal spray coating and also may ensure the bonding strength between the CFRP surface and a metal coating layer which is formed by thermal spray coating. Another objective of the present disclosure is to provide a hydraulic cylinder including a component coated by the method.

A further objective of the present disclosure is to provide a CFRP surface coating method that may improve the longitudinal or transverse strength of components such as cylinder tubes and rods of hydraulic cylinders, and to provide a hydraulic cylinder including a component coated by the method.

Other objectives and advantages of various embodiments of the present disclosure will be described below. The other objectives and advantages of the present disclosure will be accepted more widely not only by the matters described in the various embodiments and claims but also by the means and combinations that can be generated within the scope that can be easily understood, from the embodiments of the present disclosure.

In order to achieve the above objectives, according to one aspect of the present disclosure, there is provided a carbon fiber reinforced plastic (CFRP) surface coating method, the method including: forming a mesh layer on a CFRP surface; fixing the mesh layer on the CFRP surface by impregnating a heat-resistant resin therein; and forming a metal coating layer by thermal spray coating on the fixed mesh layer in which the heat-resistant resin is impregnated.

In addition, according to a preferred embodiment of the present disclosure, the forming of the mesh layer may include: laminating at least one unit mesh on the CFRP surface.

In addition, according to a preferred embodiment of the present disclosure, the laminating of the unit mesh may be performed by winding the unit mesh on the CFRP surface while orienting either a weft or a warp of the unit mesh horizontally, vertically, or inclinedly at an angle of 45 degrees with respect to a longitudinal direction of the CFRP surface.

Furthermore, according to a preferred embodiment of the present disclosure, the forming of the mesh layer may include: pressurizing and fixing at least one unit mesh on the CFRP surface.

Furthermore, according to a preferred embodiment of the present disclosure, before the forming of the metal coating layer by thermal spray coating on the fixed mesh layer in which the heat-resistant resin is impregnated, exposing a top portion of the mesh layer by removing the heat-resistant resin coated on the top portion of the fixed mesh layer in which the heat-resistant resin is impregnated may be performed.

Furthermore, according to a preferred embodiment of the present disclosure, the heat-resistant resin may include any one resin selected from the group consisting of a polyester resin, an epoxy resin, and a phenol resin.

In addition, according to another embodiment of the present disclosure, the present disclosure may provide a hydraulic cylinder including at least one component having a CFRP surface, where a surface of the component is coated by the CFRP surface coating method.

As described above, according to the present disclosure, the following advantages may be expected.

By forming a mesh layer on a CFRP surface, the CFRP surface is protected from damage by thermal spray coating and tight bonding strength between the CFRP surface and a metal coating layer formed by thermal spray coating may be established. In addition, the method has the advantage of maximizing the quality of the metal coating layer formed by the thermal spray coating, which is excellent in terms of wear resistance, corrosion resistance, and impact resistance.

In addition, by forming the mesh layer along the longitudinal or transverse direction of the cylinder tube or rod, the longitudinal or transverse strength is improved.

These effects contribute to the development of lightweight hydraulic cylinders.

The effect of the present disclosure will be accepted more widely not only by the matters described in the embodiment and claims, but also by the effects that can be generated within the scope that can be easily understood and the possibility of the advantages that contribute to the development of the industry.

DETAILED DESCRIPTION OF THE INVENTION

Hereinbelow, a detailed description based on a preferred embodiment of the present disclosure will be provided with reference to the accompanying drawings. Advantages and features of the present disclosure and a method for achieving them will be apparent with reference to embodiments described below together with the attached drawings. The terms used herein are only for explaining embodiments and are not to be understood as limiting the inventive concept. The terms in a singular form in the specification also include plural forms unless otherwise specified, and the words indicating the direction in the description are for aiding understanding of the description and may be changed according to the viewpoint.

The objective of the present disclosure is intended to provide a CFRP surface coating method capable of being used in the process of manufacturing lightweight hydraulic cylinders. To manufacture a lightweight cylinder, the components thereof, such as a tube and a piston rod of the cylinder, are required to be manufactured by using CFRP entirely or partially only on the surfaces thereof. Therefore, to manufacture the lightweight cylinder, it is necessary to perform a CFRP surface coating method, and in this method, a mesh layer should be formed on a CFRP surface in an effort to minimize or remove mechanical and/or thermal damage to carbon fibers, resin or epoxy on the CFRP surface. In the cylinder manufactured by the method, the bonding strength and the integration strength between the CFRP surface and the metal coating layer formed by the thermal spray coating is improved, and the quality of the metal coating layer may be maximized by the thermal spray coating.

Figure 1:
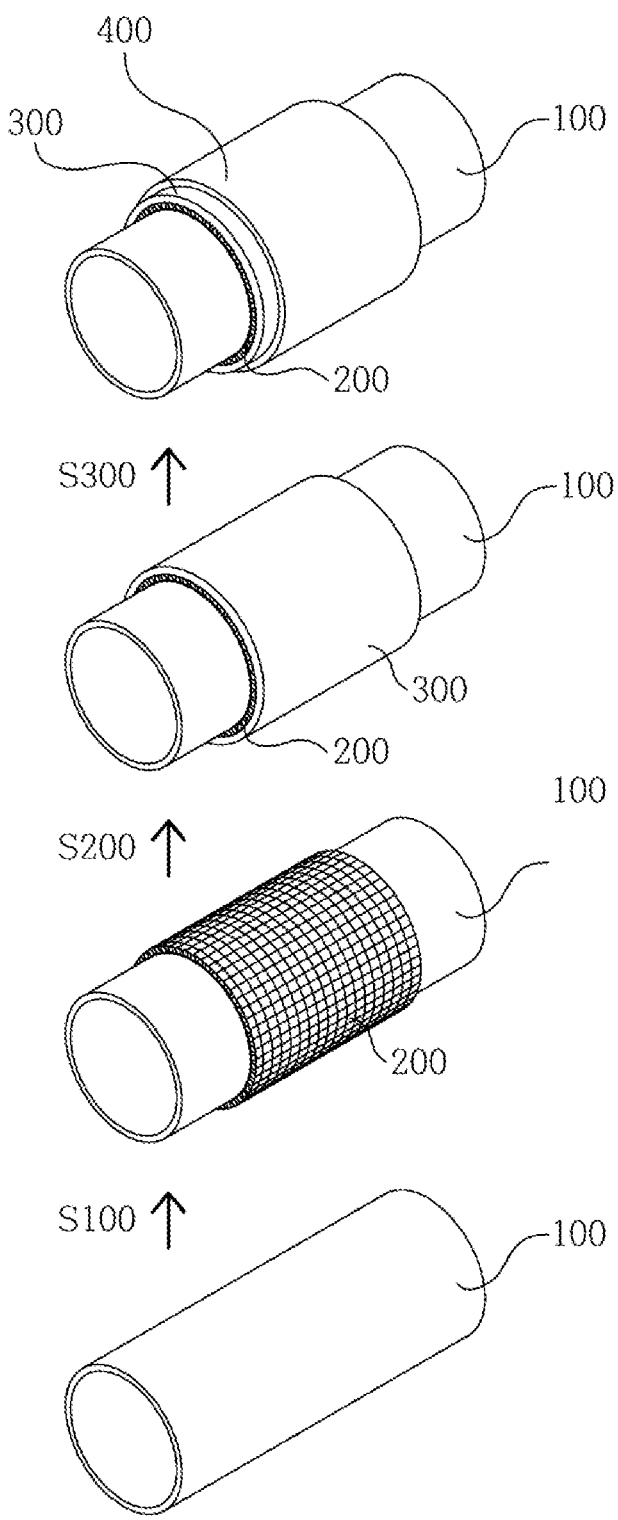
FIG. 1 is a diagram schematically illustrating the sequence of a carbon fiber reinforced plastic (CFRP) surface coating method according to an embodiment of the present disclosure.
Figure 2:
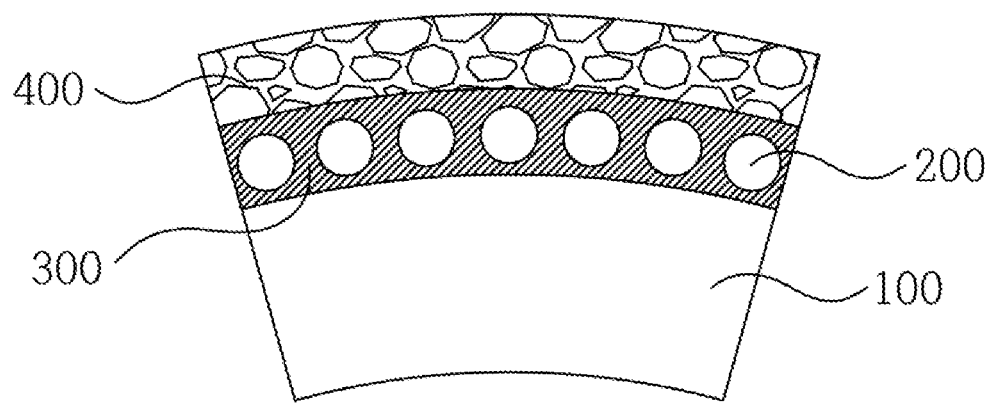
FIG. 2 is a cross-sectional view illustrating a coating layer formed by the CFRP surface coating method according to an embodiment of the present disclosure.

For this, as shown in FIGS. 1 and 2, a CFRP surface coating method according to the present disclosure includes: forming a mesh layer on a CFRP surface (S100); fixing a mesh layer (S200); and forming a metal coating layer (S300).

Here, for ease of understanding a detailed description, the terms which may be confused among the terms used in the description will be clarified as follows.

A "Mesh" refers to a structure with metal material in which a weft yarn and warp yarn having a certain diameter are perpendicular to each other, and a mesh is constructed to have a certain number of net knots per 1-inch interval.

A "Unit mesh" refers to a sheet of mesh. The shape of the unit mesh may be formed to have an area that corresponds to the area of the CFRP surface 100 and may be formed to have a certain length that may be wound several times on the CFRP surface 100.

The forming of a mesh layer (S100) is a process of forming a mesh layer 200 on the CFRP surface 100. This forming of the mesh layer (S100) may form the mesh layer 200 by laminating one or more unit meshes on the CFRP surface 100 in a variety of ways.

In other words, in the forming of the unit mesh layer to have an area corresponding to the CFRP surface 100, the mesh layer 200 may be formed by wrapping the unit mesh on the CFRP surface 100, or the mesh layer 200 may be formed by wrapping or winding the unit mesh on the CFRP surface 100 several times sequentially.

In addition, the mesh layer 200 may be formed by wrapping or winding the unit mesh in a long length continually along the CFRP surface 100.

In addition, the mesh layer 200 may be formed by segmenting the unit mesh into multiple unit meshes and by covering the entire CFRP surface 100 with the unit meshes by wrapping the unit meshes, or the mesh layer 200 may be formed by wrapping these unit meshes several times.

The direction of wrapping or winding the unit mesh may be done at various angles. However, it is preferable to wind or wrap the unit mesh on the CFRP surface 100 while orienting either a weft or a warp of the unit mesh horizontally, vertically, or inclinedly at an angle of 45 degrees with respect to a longitudinal direction of the CFRP surface. This is because by orienting either the weft or warp of the unit mesh to correspond to the longitudinal or transverse direction of the cylinder tube or rod, the longitudinal or transverse strength can be improved.

Figure 3:
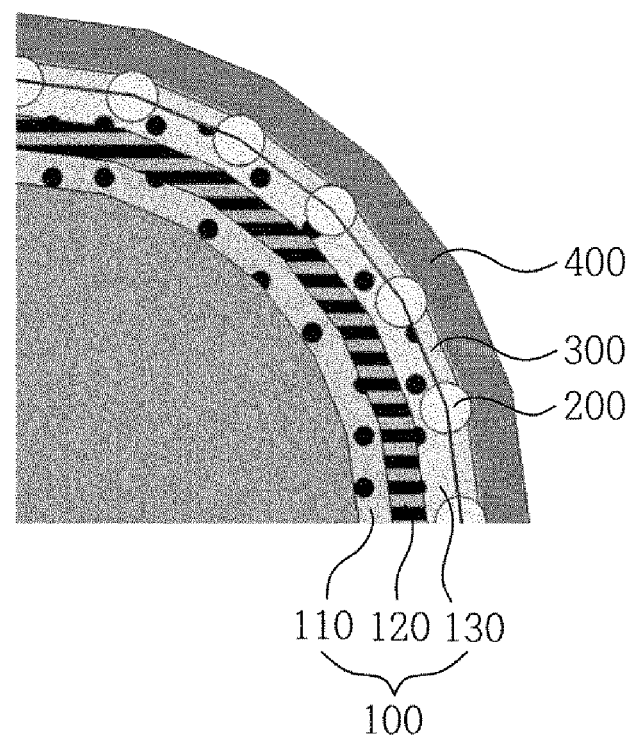
FIG. 3 is a perspective sectional view sequentially illustrating layers formed by a CFRP surface coating method according to another embodiment of the present disclosure.
Figure 4:
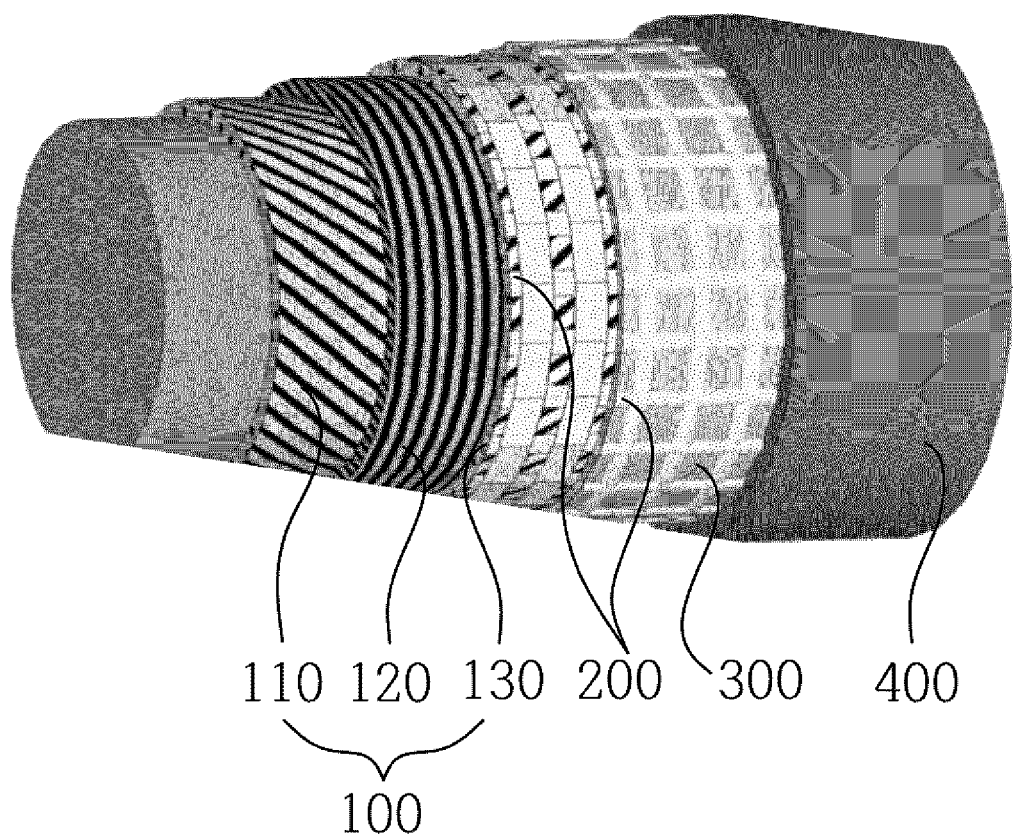
FIG. 4 is a cross-sectional view illustrating the layers formed by a CFRP surface coating method according to still another embodiment of the present disclosure.

On the other hand, as illustrated in FIGS. 3 to 4, the forming of a mesh layer (S100) may be performed by pressurizing and fixing at least one unit mesh on the CFRP surface 100, instead of laminating same by wrapping or winding.

In other words, the mesh layer 200 may be formed by pressurizing the unit mesh with a predetermined pressure and temperature conditions on the CFRP surface 100 on which prepregs 110, 120, and 130 may be disposed horizontally, vertically, or inclinedly at an angle of 45 degrees with respect to a longitudinal direction of the component such as the cylinder tube or rod that is to be laminated.

Next, the fixing of a mesh layer (S200) is a performed, in which the mesh layer 200 is fixed by impregnating a heat-resistant resin 300 to the CFRP surface on which the mesh layer 200 is formed.

The heat-resistant resin 300 is selected from the group consisting of a polyester resin, an epoxy resin, and a phenolic resin and improves the bonding strength and structural strength between the CFRP surface 100 and the mesh layer 200.

Here, it is preferred to expose a part of the mesh layer after fixing the mesh layer (S200). In other words, the method may include exposing a part of the mesh layer before the forming a metal coating layer (S300).

This process is to improve the completion of the thermal spray coating, as illustrated in FIG. 3. In this process, the top portion of the mesh layer 200 is exposed by removing the heat-resistant resin 300 that is coated on the top of the fixed mesh layer 200 which is impregnated with the heat-resistant resin 300. Here, this step may be performed by using grit blasting, SiC sandpaper polishing, or other mechanical processing methods.

Next, forming a metal coating layer (S300) is performed. The forming of the metal coating layer (S300) is a process of forming a metal coating layer 400 by thermal spray coating on the fixed mesh layer 200 impregnated with the heat-resistant resin 300 or on the mesh layer 200 which is fixed by the heat-resistant resin 300 and of which the top portion is exposed by removing the heat-resistant resin 300 from the top portion.

The metal coating layer 400 may be formed by performing thermal spray coating which includes: changing a powder or linear material of metal, ceramic, or mixtures thereof to molten droplets by using a high-temperature heat source, colliding the molten droplets to the mesh layer 200 at high-speed, and forming a laminated film from rapid solidification of the molten droplets.

In particular, since the top portion of the mesh layer 200 is exposed before the forming a metal coating layer (S300), when thermal spray coating performed in the forming of the metal coating layer (S300), the metal coating is gradually grown starting from the metal coating formed when the molten droplets collide on the surface of the mesh layer 200. Thus the metal coating may be realized through combining the metal coating with adjacent metal coating.

The molten droplets melted by the heat source, accelerated, and reaching the CFRP surface 100 to be laminated thereon have a high-temperature and high dynamic energy. Thus, when the molten droplets impact a surface consisting only of the CFRP 100 and a resin (or an epoxy), thermal damage to the resin occurs rapidly and thermally, and the carbon fiber of CFRP is broken by the dynamic energy so that a coating is not formed or discontinuous coating is formed.

However, when the mesh layer 200 strongly bonded to the CFRP surface 100 by the heat-resistant resin 300 exists and also the ratio of width to opening is adequate, the damage to the low heat-resistant resin 300 is minimized or inhibited and the molten droplets are stably and strongly attached on the mesh layer 200 having strong mechanical properties, due to the fact that the molten droplets do not directly contact with the heat-resistant resin 300 but are laminated on the top surface of the mesh layer 200. Since this metal mesh layer 200 has an outstanding thermal conductivity, the increased local temperature accumulated by the molten droplets may be quickly transferred to other parts of the metal mesh layer 200 so that damage to the CFRP 100 is prevented.

Here thermal spray coating may be performed in any one selected from a variety of thermal spray methods, such as plasma spraying with small air-pores and excellent bonding strength, high-speed spraying that may form a high-density film, wire spraying that has a low thermal impact on the substrate, flame powder spraying that is capable of performing thick film coating, and flame rod spraying that may form elaborate ceramic coating.

In this way, in colliding molten metal particles to the fixed mesh layer 200 impregnated with the heat-resistant resin 300, by preventing damage to the CFRP surface caused by the thermal spray coating and tightening the bonding between metal particles and meshes, the completion of the metal coating layer 400 which is excellent in terms of wear resistance, corrosion resistance, and impact resistance may be realized.

By applying the CFRP surface coating method according to the present disclosure described above to cylinder tubes or rods of which the entire or surfaces thereof are formed of CFRP, a stable coating layer and a lightweight hydraulic cylinder with increased strength may be realized.

Although the present invention has been described in conjunction with the preferred embodiment and the accompanying drawings, the present invention should not be construed as being limited to the embodiment. Those skilled in the art will appreciate that various modifications, additions, and substitutions are possible, without departing from the scope and spirit of the invention as disclosed in the accompanying claims. Furthermore, embodiments and drawings of the present disclosure are not intended to limit the spirit of the present disclosure, but to efficiently describe the spirit. Thus, it is noted that the spirit of the present disclosure is not limited by the embodiments and drawings.

The present disclosure relates to a carbon fiber reinforced plastic (CFRP) surface coating method and a hydraulic cylinder including a component coated by the method. More particularly, for implementing a lightweight hydraulic cylinder, the present disclosure may be used in a hydraulic cylinder in which all or a part of components such as a rod or tube of a hydraulic cylinder are formed of the CFRP so that the surface thereof is formed of a coating layer that is coated by the method of the present disclosure.

What is claimed is:

1. A carbon fiber reinforced plastic (CFRP) surface coating method, comprising:
    forming a mesh layer on a CFRP surface;
    fixing the mesh layer on the CFRP surface by impregnating a heat-resistant resin therein; and
    forming a metal coating layer by thermal spray coating on the fixed mesh layer in which the heat-resistant resin is impregnated.

2. The method of claim 1, wherein the forming of the mesh layer comprises: laminating at least one unit mesh on the CFRP surface.

3. The method of claim 2, wherein the laminating of the unit mesh is performed by winding the unit mesh on the CFRP surface while orienting either a weft or a warp of the unit mesh horizontally, vertically, or inclinedly at an angle of 45 degrees with respect to a longitudinal direction of the CFRP surface.

4. The method of claim 1, wherein the forming of the mesh layer comprises: pressurizing and fixing at least one unit mesh on the CFRP surface.

5. The method of claim 1, wherein before the forming of the metal coating layer by thermal spray coating on the fixed mesh layer in which the heat-resistant resin is impregnated, exposing a top portion of the mesh layer by removing the heat-resistant resin coated on the top portion of the fixed mesh layer in which the heat-resistant resin is impregnated.

6. The method of claim 1, wherein the heat-resistant resin comprises any one resin selected from the group consisting of a polyester resin, an epoxy resin, and a phenol resin.

\* \* \* \* \*